United States Patent [19]
Moore

[11] 3,725,931
[45] Apr. 3, 1973

[54] AUTOMATIC INTEGRATOR CONTROL FOR RADIOMETRIC GUIDANCE

[75] Inventor: Robert P. Moore, Riverside, Calif.
[73] Assignee: The United States of America as represented by the Secretary of the Navy
[22] Filed: Apr. 16, 1971
[21] Appl. No.: 134,555

[52] U.S. Cl.............343/100 ME, 73/355 R, 73/244, 73/3.19
[51] Int. Cl. ...............................................G01w 1/00
[58] Field of Search..............343/100 ME; 73/355 R; 250/83.3 H; 244/3.19

[56] References Cited

UNITED STATES PATENTS 3,321,761  5/1967  Biagi et al. ..............343/100 ME UX Primary Examiner—Benjamin A. Borchelt
Assistant Examiner—Richard E. Berger
Attorney—R. S. Sciascia, G. J. Rubens, J. W. McLaren and T. M. Phillips

[57] ABSTRACT

A microwave radiometric sensor is provided with a voltage variable integrator controlled by a voltage from a difference amplifier that compares the integrator output signal with a reference voltage. The reference voltage is established at a value to maintain an optimum signal-to-noise ratio of the target signal.

1 Claim, 1 Drawing Figure

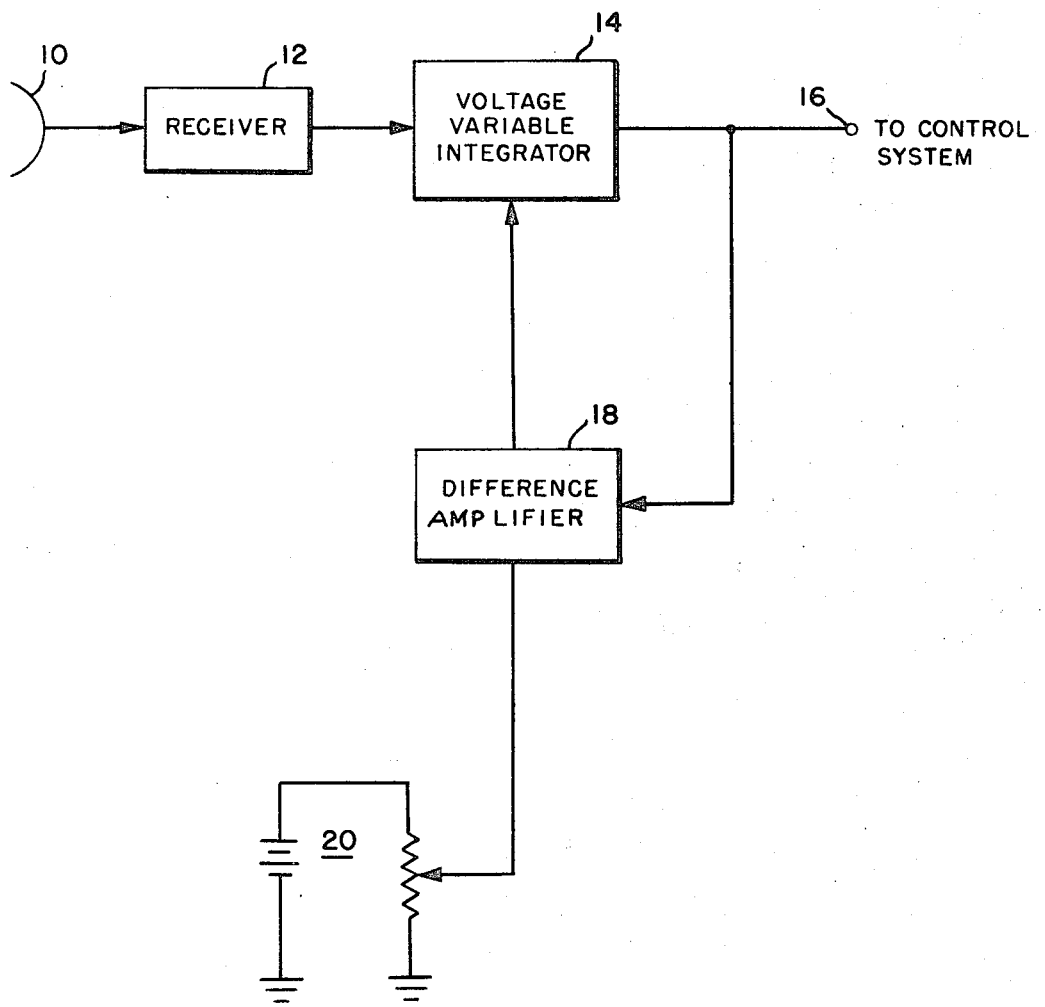

AUTOMATIC INTEGRATOR CONTROL FOR RADIOMETRIC GUIDANCE

STATEMENT OF GOVERNMENT INTEREST

The invention described herein may be manufactured and used by or for the Government of the United States of America for governmental purposes without the payment of any royalties thereon or therefor.

SUMMARY OF THE INVENTION

The present invention relates to a radiometric missile guidance system which adjusts the integration time of a microwave radiometric sensor in a guidance system as the missile approaches the target. This maximizes the radiometer sensitivity for all ranges and thus increases the maximum range to the target while allowing the minimum control system response time. A voltage variable integrator and a difference amplifier are connected between the radiometric receiver and the missile control system. A reference voltage is provided which represents a given receiver signal-to-noise ratio. With the detection of a target, the signal output of the receiver increases as the range decreases, and this represents an increase in the signal-to-noise ratio which eventually reaches the value represented by the reference voltage. This causes the difference amplifier to produce an output voltage which causes the integration time of the voltage variable integrator to decrease as the range decreases simultaneously as the signal from the target increases. This decrease in integration time response represents a decrease in overall system response time and provides more missile manueverability. As the integration time is decreased the sensor sensitivity is decreased and the integrator output signal will remain constant with increasing input signal.

Accordingly, an object of the invention is to provide a system which will allow a radiometric sensor to have maximum sensitivity for all ranges while allowing the minimum overall missile guidance response time for all ranges compatible with sensor sensitivity.

Other objects and many of the attendant advantages of this invention will be readily appreciated as the same becomes better understood by reference to the following detailed description when considered in connection with the accompanying drawings wherein there is shown in the single FIGURE a block diagram of a preferred embodiment of the invention.

Referring now to the drawing there is shown an antenna 10 coupled to a radiometer RF receiver 12. A voltage variable integrator circuit 14 is coupled to the output of receiver 12. The output of integrator 14 which normally would be connected to the remainder of the missile guidance control system is shown connected to terminal 16. A difference amplifier 18 has a first input coupled to the output of voltage variable integrator 14 and a second input coupled to a reference voltage source 20. The output of difference amplifier 18 is coupled as a control voltage to voltage variable integrator 14.

In operation, initially, reference voltage source 20 is set to a value which represents a given receiver signal-to-noise ratio. This value may be in terms of the value of the receiver 12 noise output in the absence of a signal. A preferred value of six times the value of the receiver noise in the absence of a signal output. This gives a very high probability of detection over a 99 percent and a very low probability of false alarm. Prior to target detection, the two inputs to difference amplifier 18 are reference voltage 20 and the noise output of receiver 12. Difference amplifier 18 should be adjusted to give a zero output for these two inputs and integrator 14 should be adjusted to have maximum integration (the maximum integration time is determined by the expected maximum slant range) for zero output. Difference amplifier 18 should be biased so that it will not produce an output until the output of integrator 14 exceeds the reference voltage.

When a target is detected, the signal out of integrator 14 will increase as the range is decreased. This represents an increase in the signal-to-noise ratio. When the signal-to-noise ratio reaches the value represented by the reference voltage, a feed back voltage will be produced by amplifier 18. The feed back voltage should be coupled to integrator 14 in such a manner as to decrease the integration time as the range decreases and the signal from the target increases. The decrease in integration time represents a decrease in overall system (sensor and control) response time and increases missile manueverability. As the integration time is decreased, the sensor sensitivity is decreased causing the output of integrator 14 to remain constant with increasing input signal.

Obviously many modifications and variations of the present invention are possible in the light of the above teachings. It is therefore to be understood that within the scope of the appended claims the invention may be practiced otherwise than as specifically described.

What is claimed is:

1. In a guided missile radiometric guidance system, an integrator control comprising in combination:
 a. a radiometer RF receiver providing an output proportional to target size as the target appears to the receiver,
 b. a voltage variable integrator having a first input coupled to the output of said receiver, a second input and an output for generating an output signal proportional to the signal-to-noise ratio of the output signal of said receiver,
 c. a reference voltage source for providing a predetermined reference voltage representing a given receiver signal-to-noise ratio,
 d. a difference amplifier having a first input coupled to the output of said variable integrator, a second input coupled to said reference voltage and an output coupled to said second input of said voltage variable integrator for providing a control voltage to maintain the output of said voltage variable integrator constant at said predetermined signal-to-noise ratio to maximize the radiometer sensitivity for all ranges and increase the maximum range to the target to allow minimum control system response time.

* * * * *